US012489259B2

(12) United States Patent
Martinez Valerio et al.

(10) Patent No.: US 12,489,259 B2
(45) Date of Patent: Dec. 2, 2025

(54) L-TYPE ELECTRICAL OUTLET HOUSING AND MOUNTING KIT

(71) Applicant: Eaton Intelligent Power Limited, Dublin (IE)

(72) Inventors: Elias Martinez Valerio, Nezahualcoyotl (MX); Luis Manuel Alba Regalado, Mexico City (MX); Cristian Andres Oses Bastias, Antofagasta (CL)

(73) Assignee: Eaton Intelligent Power Limited, Dublin (IE)

( * ) Notice: Subject to any disclaimer, the term of this patent is extended or adjusted under 35 U.S.C. 154(b) by 294 days.

(21) Appl. No.: 18/235,415

(22) Filed: Aug. 18, 2023

(65) Prior Publication Data

US 2024/0063591 A1 Feb. 22, 2024

Related U.S. Application Data

(60) Provisional application No. 63/399,465, filed on Aug. 19, 2022.

(51) Int. Cl.
*H01R 13/74* (2006.01)
*H01R 13/52* (2006.01)

(52) U.S. Cl.
CPC ....... *H01R 13/748* (2013.01); *H01R 13/5202* (2013.01)

(58) Field of Classification Search
None
See application file for complete search history.

(56) References Cited

U.S. PATENT DOCUMENTS

| 3,928,716 | A  | * | 12/1975 | Marrero | H02G 3/125 |
| | | | | | 174/57 |
| 5,931,325 | A  | * | 8/1999  | Filipov | H02G 3/081 |
| | | | | | 220/3.7 |
| 6,188,022 | B1 | * | 2/2001  | He      | H02G 3/18 |
| | | | | | 174/58 |
| 9,419,422 | B2 | * | 8/2016  | Gonzalez | H02G 3/121 |
| 9,825,446 | B2 | * | 11/2017 | Korcz   | H02G 3/125 |

(Continued)

FOREIGN PATENT DOCUMENTS

KR 101150377 B1 * 6/2012 ............. H02G 3/125

OTHER PUBLICATIONS

Office Action issued in Chilean Application No. 202302442, mailed Aug. 12, 2024, 11 pages.

*Primary Examiner* — Tho D Ta
(74) *Attorney, Agent, or Firm* — Talem IP Law, LLP

(57) ABSTRACT

An L-type electrical outlet housing includes a body sized to house at least one L-type electrical outlet, the body including an outlet side and a mounting side. The outlet side of the body includes an insertion aperture for receiving an Omega bracket and an L-type electrical outlet within the body, a plurality of top and bottom screw, and a left and right Omega bracket aperture. The mounting side of the body includes a left housing screw aperture and a right housing screw aperture for mounting the body. A kit for securing the L-type electrical outlet housing includes a spring cover, a gasket, an electrical outlet plate, the Omega bracket, left and right Omega bracket screws, a first and second plurality of screws, left and right housing and mounting screws, and a mounting strap.

16 Claims, 9 Drawing Sheets

(56) References Cited

U.S. PATENT DOCUMENTS

| | | | |
|---|---|---|---|
| 10,530,141 B1* | 1/2020 | Fioriello | H02G 3/14 |
| 10,559,946 B1* | 2/2020 | Shang | H02B 1/042 |
| 2008/0146078 A1* | 6/2008 | Braathen | H01R 13/74 |
| | | | 439/536 |
| 2010/0078535 A1* | 4/2010 | Brocklesby | H02G 3/10 |
| | | | 248/224.8 |
| 2014/0043732 A1* | 2/2014 | McKay | H02G 3/14 |
| | | | 361/622 |
| 2018/0062365 A1* | 3/2018 | Kellerman | H02G 3/12 |

* cited by examiner

L-TYPE ELECTRICAL OUTLET HOUSING AND MOUNTING KIT

BACKGROUND

In some industrial environments, conventional electrical outlet housings (e.g., those designed for home and/or office installation) may be used. These conventional electrical outlet housings tend to be made of materials that are not designed to withstand the corrosion and contamination by materials, dust, and gases that are encountered in those industrial environments. This causes delays and/or work stoppages when these electrical outlet housings are damaged and/or destroyed, which, in addition to the cost of replacing these electrical outlet housings (e.g., material and personnel time cost), results in a costly situation for businesses that operate in these industrial environments.

Some solutions for these electrical outlet housings have been implemented which are made of better materials suitable for industrial environments. However, these solutions have been found to have drawbacks for the manufacturers and customers of these electrical outlet housings. These drawbacks include low yield (e.g., high manufacturing reject rate) during the manufacturing process for the manufacturers, problems with mounting these electrical outlet housings in industrial environments, and problems with interchangeability between electrical outlets made by different manufacturers.

BRIEF SUMMARY

L-type electrical outlet housings and mounting kits are described herein. Advantageously, the described L-type electrical outlet housings and mounting kits are made of materials that can withstand industrial environments, have high yield during the manufacturing process, easily mount to existing infrastructure in industrial environments, and allow for any commercially available L-type electrical outlet and/or main breakers to be housed within the L-type electrical outlet housings.

An L-type electrical outlet housing includes a body sized to house at least one L-type electrical outlet, where the body includes an outlet side and a mounting side on an opposite side of the body as the outlet side. The outlet side of the body includes an insertion aperture for receiving an Omega bracket and an L-type electrical outlet within the body, a plurality of top screw apertures above the insertion aperture for securing a gasket and an electrical outlet plate with a first plurality of screws, a plurality of bottom screw apertures below the insertion aperture for securing the gasket and the electrical outlet plate with a second plurality of screws, a left Omega bracket aperture positioned to the left of the insertion aperture for securing the Omega bracket with a left Omega bracket screw, and a right Omega bracket aperture positioned to the right of the insertion aperture for securing the Omega bracket with a right Omega bracket screw. The mounting side of the body includes a left housing screw aperture and a right housing screw aperture for mounting the body.

In some cases, the left housing screw aperture and the right housing screw aperture of the mounting side of the body are positioned at a vertical midpoint of the mounting side of the body. In some cases, the mounting side of the body does not include a protruding mounting foot. In some cases, the body is monolithic.

In some cases, the outlet side of the body includes a second insertion aperture (as well as other features) needed to receive a second L-type electrical outlet or a main breaker. In some cases, the outlet side of the body includes a third insertion aperture (as well as other features) needed to receive a third L-type electrical outlet. In some cases, the outlet side of the body includes a fourth insertion aperture (as well as other features) needed to receive a fourth L-type electrical outlet. In some cases, the body further includes a top side and a bottom side, wherein at least one of the top side or the bottom side of the body includes an electrical inlet aperture configured to receive electrical conduit.

A kit for securing the L-type electrical outlet housing includes a first spring cover for covering the insertion aperture after the Omega bracket and the L-type electrical outlet are received, the gasket, the electrical outlet plate, the Omega bracket, the left Omega bracket screw, the right Omega bracket screw, the first plurality of screws, the second plurality of screws, the left housing screw, the right housing screw, a left mounting screw, a right mounting screw, and a mounting strap for attachment to a Unistrut Channel or a wall. The mounting strap includes a left housing aperture, a left mounting aperture that extends past the body when mounted to the Unistrut Channel or a wall, a right housing aperture, and a right mounting aperture that extends past the body when mounted to the Unistrut Channel or a wall.

In some cases, the kit includes components for receiving the second Omega bracket and the second L-type electrical outlet or the main breaker. In some cases, the kit includes components for receiving the third Omega bracket and the third L-type electrical outlet. In some cases, the kit includes components for receiving the fourth Omega bracket and the fourth L-type electrical outlet. In some cases, the electrical outlet plate and the gasket are sized to receive any commercially available L-type electrical outlet. In some cases, the kit further includes a pair of Omega bracket bushings.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

L-type electrical outlet housings and mounting kits are described herein. Advantageously, the described L-type electrical outlet housings and mounting kits are made of materials that can withstand industrial environments, have high yield during the manufacturing process, easily mount to existing infrastructure in industrial environments, and allow for any commercially available L-type electrical outlet and/or main breakers to be housed within the L-type electrical outlet housings.

Figure 1A:
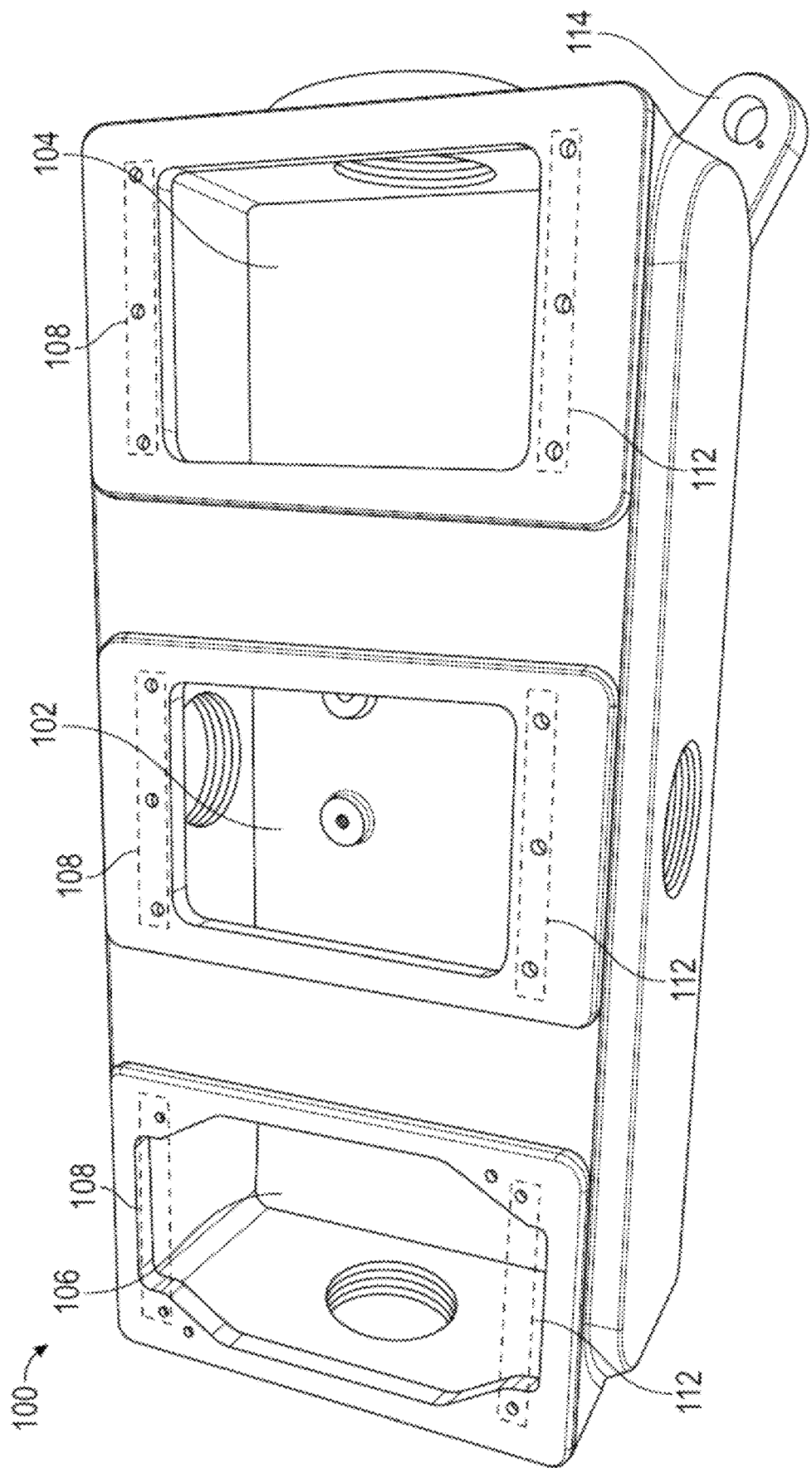
FIG. 1A is a photograph of a prior art L-type electrical outlet body sized to house a plurality of L-type electrical outlets.
Figure 1B:
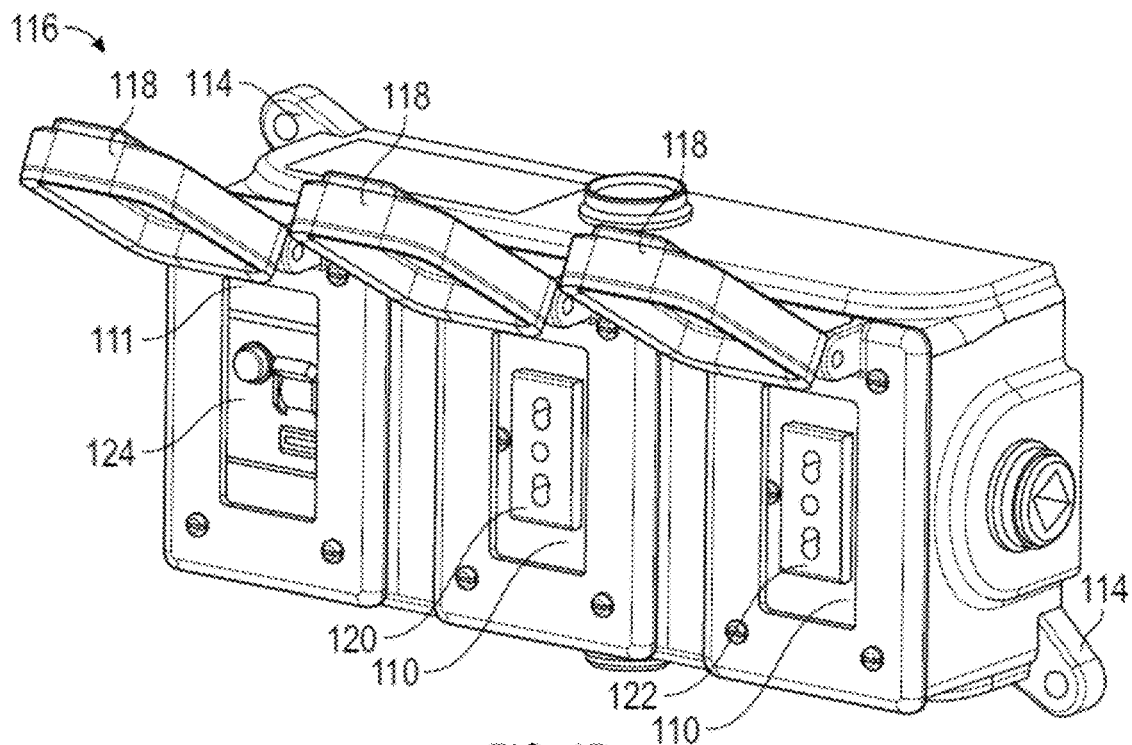
FIG. 1B illustrates a prior art L-type electrical outlet housing formed of the prior art L-type electrical outlet body that is housing two L-type electrical outlets and a main breaker.
Figure 1C:
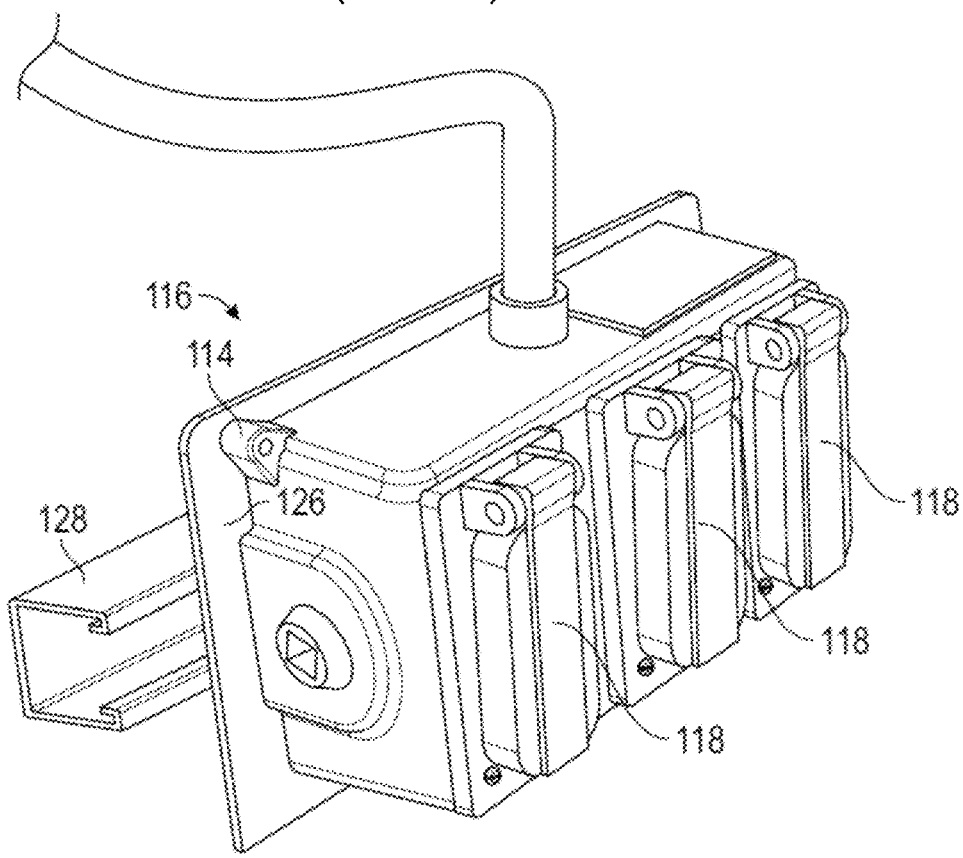
FIG. 1C is a photograph of the prior art L-type electrical outlet housing attached to a Unistrut Channel.
Figure 2A:
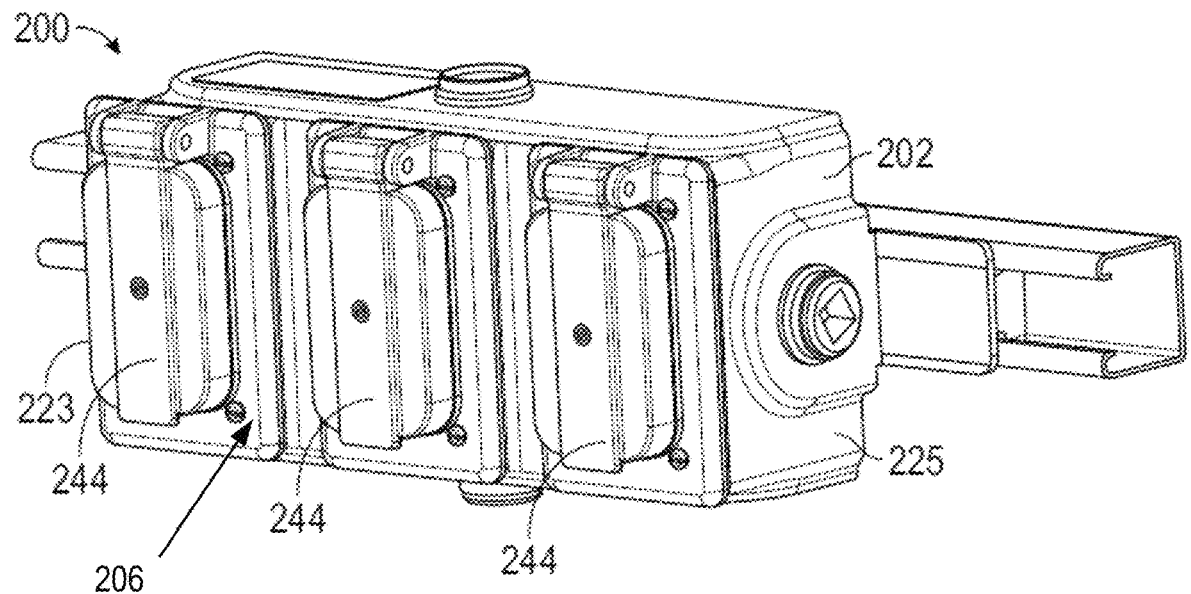
FIGS. 2A-2D illustrate an embodiment of an L-type electrical outlet housing and components of a kit in various states of assembly.
Figure 2B:
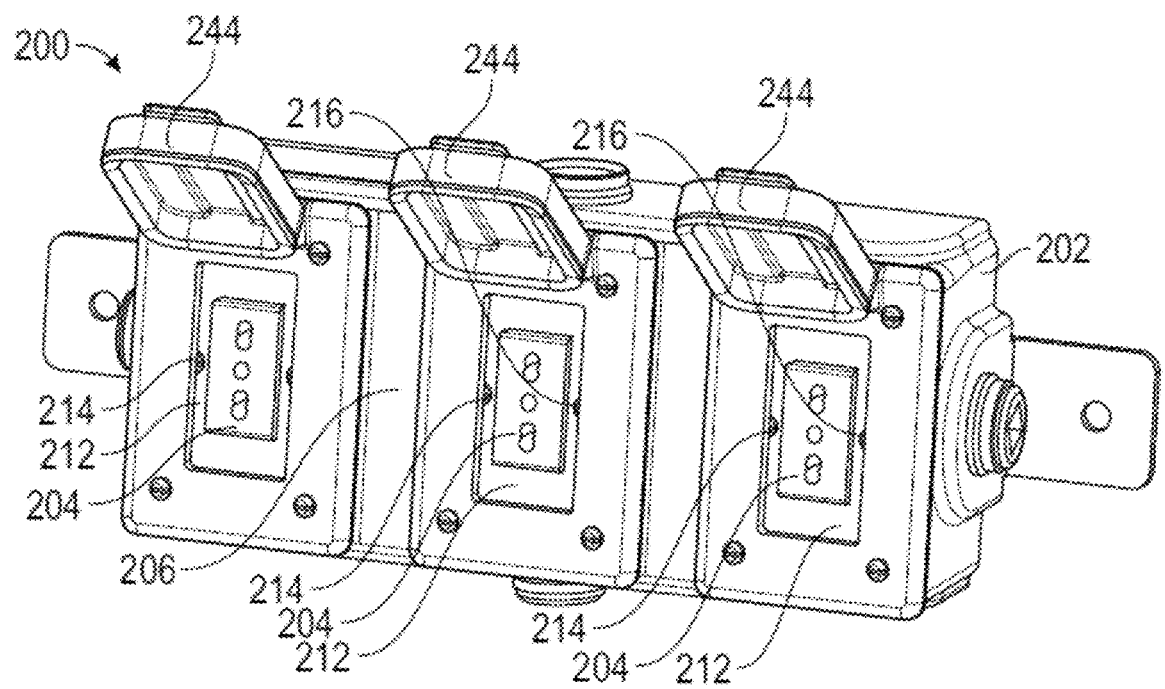
Figure 2C:
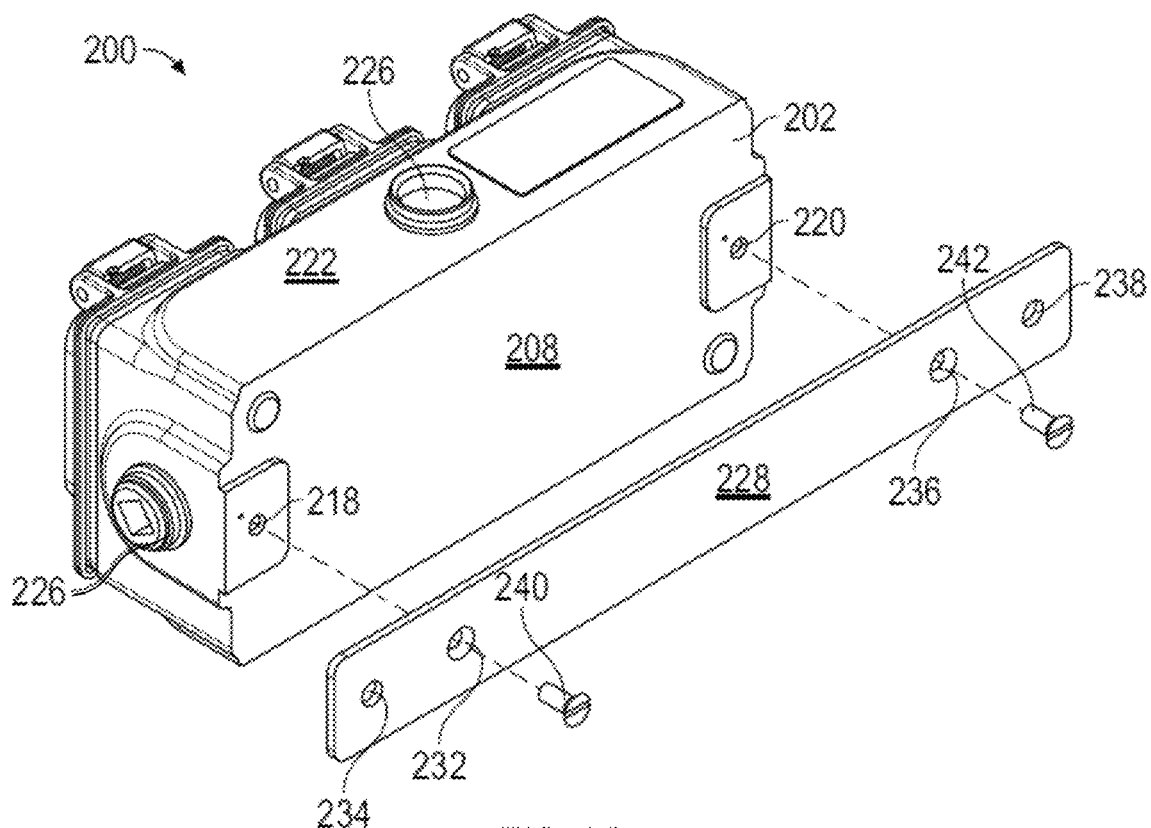
Figure 2D:
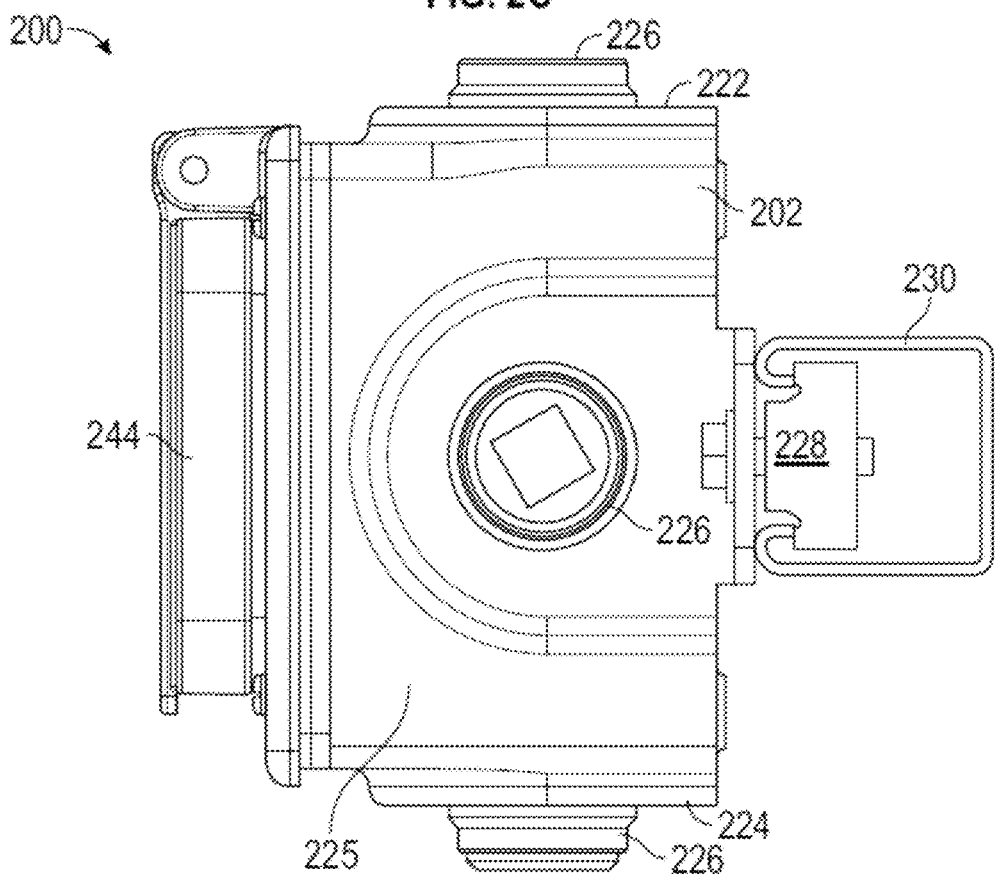

FIG. 1A is a photograph of a prior art L-type electrical outlet body sized to house a plurality of L-type electrical outlets; FIG. 1B illustrates a prior art L-type electrical outlet housing formed of the prior art L-type electrical outlet body that is housing two L-type electrical outlets and a main breaker; and FIG. 1C is a photograph of the prior art L-type electrical outlet housing attached to a Unistrut Channel. Referring to FIGS. 1A-1C, a body 100 includes two L-type electrical outlet insertion apertures 102, 104 and one main breaker insertion aperture 106 (which can also be used to insert another L-type electrical outlet). Each insertion aperture 102, 104, 106 includes a plurality of top screw apertures 108 located above their respective insertion aperture 102, 104, 106 for securing a gasket and an electrical outlet plate 110/main breaker plate 111, a plurality of bottom screw apertures 112 located below their respective insertion aperture 102, 104, 106 for securing the gasket and the electrical outlet plate 110/main breaker plate 111, and a pair of protruding mounting feet 114 for securing the body 100 to a fixed surface. The body 100 is made of aluminum, which is a material that can withstand industrial environments.

As shown in FIGS. 1B and 1C, an L-type electrical outlet housing 116 formed of the body 100 includes a spring cover 118 for covering each insertion aperture 102, 104, 106, a gasket (not illustrated in these Figures), two L-type electrical outlets 120, 122 and a main breaker 124, the electrical outlet plate 110, an Omega bracket (not illustrated in these Figures), and a mounting plate 126 for attachment to a Unistrut Channel 128 that is commonly used in industrial environments.

However, there are several drawbacks to this L-type electrical outlet housing 116. One drawback is that the protruding mounting feet 114 are difficult to manufacture, resulting in a low yield (e.g., manufacturing reject rate of about 50%). This causes higher manufacturing costs for the manufacturers and results in a higher price to customers. Another drawback is that because the protruding mounting feet 114 are positioned at opposing corners of the body 100, the mounting plate 126 is oversized for what it is connected to (e.g., the Unistrut Channel 128). This results in excess material being used for the mounting plate 126, which also increases costs to manufacturers and results in a higher price to customers.

Customers can use the insertion aperture 106 to add a third L-type electrical outlet. Another drawback is that the gasket and the electrical outlet plate 110 are only sized to fit around a Vimar L-type electrical outlet (e.g., Contacto Tipo "L" 10/16A), which means that other commercially available L-type electrical outlets (e.g., Bticino A5180 and Bticino AM5180) cannot be used. This can be an issue, especially depending on the country in which the L-type electrical outlet is needed (e.g., different brands of L-type electrical outlets may be approved for use in some countries and not others; and the cost of shipping from manufacturers may vary depending on the location/country in which the industrial environment is located).

Yet another drawback is the number of L-type electrical outlets 120, 122 that can be used. The L-type electrical housing 116 only allows for a maximum of two L-type electrical outlets 120, 122 and a main breaker 124 to be housed. Therefore, customers who desire other configurations for housing L-type electrical outlets (e.g., 3 L-type electrical outlets; 3 L-type electrical outlets and a main breaker; 4 L-type electrical outlets) are unable to have their needs fulfilled.

Figure 5A:
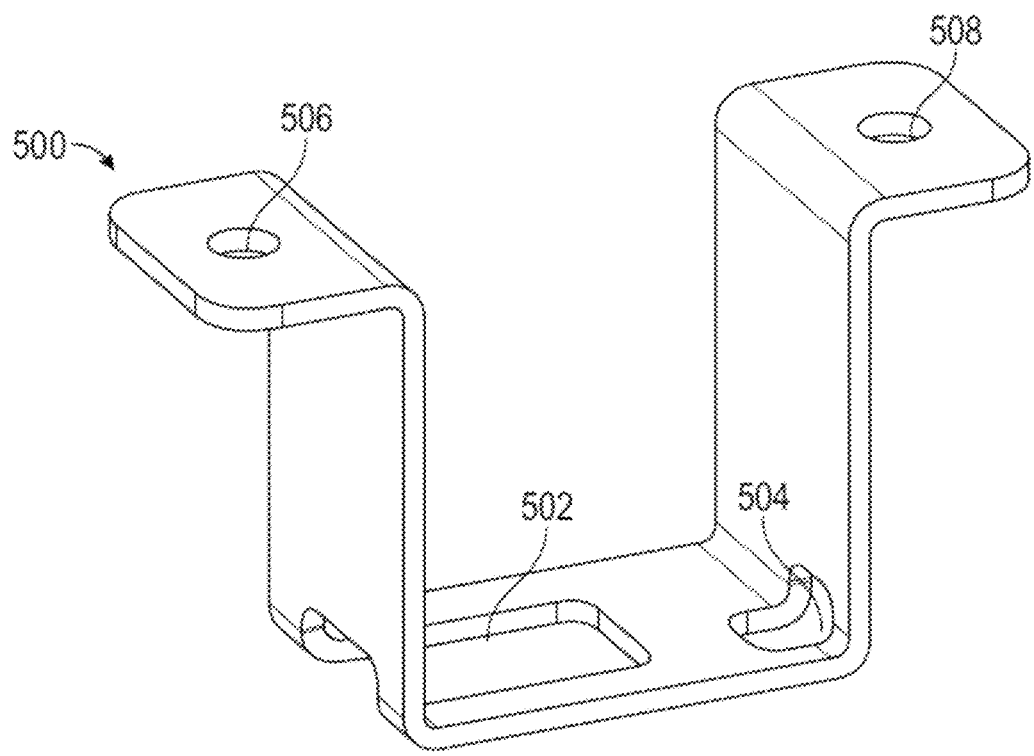
FIGS. 5A and 5B illustrate Omega brackets that may be included in a kit.

FIGS. 2A-2D illustrate an embodiment of an L-type electrical outlet housing and components of a kit in various states of assembly. Referring to FIGS. 2A-2D, an L-type electrical outlet housing 200 includes a body 202 that is sized to house three L-type electrical outlets 204. The body 202 includes an outlet side 206 and a mounting side 208 on an opposite side of the body 202 as the outlet side 206. The outlet side 206 of the body 202 includes an L-type electrical outlet insertion aperture (not illustrated in these Figures but similar to insertion apertures 102, 104 of FIGS. 1A-1C) for receiving an Omega bracket (e.g., as illustrated in FIG. 5A) and an L-type electrical outlet 204 within the body 202.

In the illustrated embodiment, the housing is sized with three total insertion apertures. However, it should be understood that the features of the illustrated housing are applicable to smaller and larger configurations. For example, in other implementations, there may be a single insertion aperture, two insertion apertures, or four insertion apertures (with the housing sized to accommodate just that number of apertures. In some cases, a universal housing is provided with three or four apertures, but with sufficient permutations of kit parts (see e.g., FIGS. 4A-4C) for different configurations of components that are placed in the apertures, allowing customers who desire other configurations for housing L-type electrical outlets to have their needs fulfilled.

In some cases, one of the insertion apertures may be a main breaker insertion aperture (e.g., similar to insertion aperture 106 of FIGS. 1A-1C), but with a plurality of top and bottom screw apertures that are placed in a same position as a plurality of top and bottom screw apertures around an L-type electrical outlet insertion aperture, allowing customers to use a main breaker insertion aperture to add an additional L-type electrical outlet (e.g., in cases where a main breaker is not needed and/or wanted in the industrial environment).

The outlet side 206 of the body 202 further includes, for each insertion aperture, a plurality of top screw apertures above the insertion aperture for securing a gasket and an electrical outlet plate 212 with a first plurality of screws, a plurality of bottom screw apertures below the insertion aperture for securing the gasket and the electrical outlet plate 212 with a second plurality of screws, a left Omega bracket aperture positioned to the left of the insertion aperture for securing the Omega bracket with a left Omega bracket screw 214, and a right Omega bracket aperture positioned to the right of the insertion aperture for securing the Omega bracket with a right Omega bracket screw 216.

The mounting side 208 of the body 202 includes a left housing screw aperture 218 and a right housing screw aperture 220 for mounting the body 202. The left housing screw aperture 218 and the right housing screw aperture 220 are positioned at a vertical midpoint of the mounting side 208 of the body 202. As used herein, the vertical midpoint may be an exact midpoint of the vertical height of the body 202 or may be within a certain range of the exact midpoint of the vertical height of the body 202 (e.g., within a tolerance of 20% or less of the exact midpoint of the vertical height of the body 202).

Instead of a protruding mounting foot (e.g., foot 114 of FIGS. 1A-1C), the mounting side 208 of the body 202 has been replaced by the left housing screw aperture 218 and the right housing screw aperture 220 for mounting the body 202.

The body 202 can be monolithic (e.g., made of a single/uniform piece of material. In some cases, the body 202 is made of aluminum or an aluminum alloy. In some cases, the body 202 is made of materials (e.g., other than aluminum) that can withstand industrial environments, such as magnesium, titanium, steel, and the like.

The body 202 also includes a top side 222, a bottom side 224, a left side 223, and a right side 225. In the illustrated embodiment, the four sides each include an electrical inlet aperture 226 configured to receive electrical conduit (e.g., which supplies power to the L-type electrical outlets). In a specific embodiment, the bottom side, left side, and right side inlet aperture has a conduit reduction from 1"-NPT to ¾"-NPT, and a ¾"-NPT plug except the top side inlet aperture.

A kit for securing the L-type electrical outlet housing 200 includes a mounting strap 228 for attaching to a Unistrut Channel 230 or a wall. The mounting strap 228 includes a left housing aperture 232, a left mounting aperture 234 that extends past the body 202 when mounted to the Unistrut Channel 230 or a wall, a right housing aperture 236, and a right mounting aperture 238 that extends past the body 202 when mounted to the Unistrut Channel 230 or a wall. The kit further includes a left housing screw 240 and a right housing screw 242 for securing the mounting strap 228 to the body 202 (e.g., via the left and right housing apertures 232, 236 of the mounting strap 228 and the left and right housing screw apertures 218, 220 of the mounting side 208 of the body 202) and a left mounting screw and a right mounting screw (not illustrated in these Figures) for securing the mounting strap 228 to the Unistrut Channel 230 (e.g., via the left and right mounting apertures 234, 238).

For each L-type electrical outlet and/or main breaker that is used in the body 202, the kit further includes a spring cover 244 for covering the corresponding insertion aperture after the Omega bracket and the L-type electrical outlet or main breaker are received, a gasket, the electrical outlet plate 212, the Omega bracket, left and right Omega bracket screws 214, 216, a first plurality of screws (e.g., for securing the gasket and the electrical outlet plate 212 via the plurality of top screw apertures), an a second plurality of screws (e.g., for securing the gasket and the electrical outlet plate 212 via the plurality of bottom screw apertures).

Figure 3:
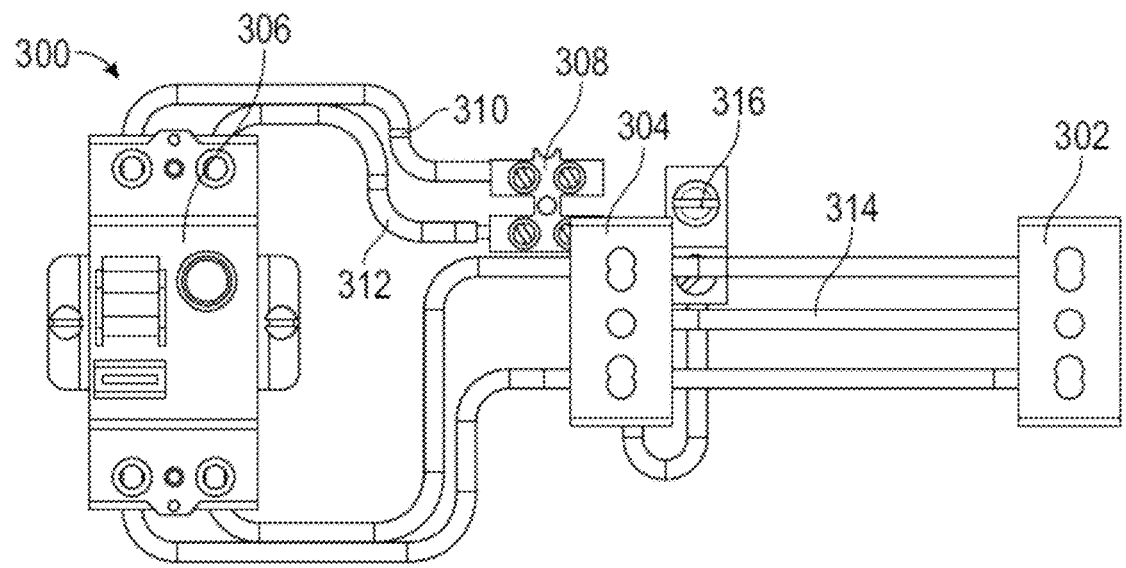
FIG. 3 illustrates a wiring diagram for wiring two L-type electrical outlets and a main breaker.

FIG. 3 illustrates a wiring diagram for wiring two L-type electrical outlets and a main breaker. Referring to FIG. 3, a wiring diagram 300 for wiring two L-type electrical outlets 302, 304 and a main breaker 306 includes a connection terminal 308 for the main power supply. Because this wiring diagram 300 includes a main breaker 306, the main breaker 306 is electrically connected to the connection terminal 308 (e.g., the red wire 310 provides positive voltage and the white wire 312 provides negative voltage). The two L-type electrical outlets 302, 304 are electrically connected to the main breaker 306 in series. The two L-type electrical outlets 302, 304 are also grounded via the green wire 314 to a ground terminal 316.

In some cases (e.g., in which there is no main breaker), a number of L-type electrical outlets (e.g., anywhere from one to four) may be electrically connected to the connection terminal 308 (e.g., the red wire 310 provides positive voltage and the white wire 312 provides negative voltage) in series and grounded via the green wire 314 to the ground terminal 316.

Figure 4A:
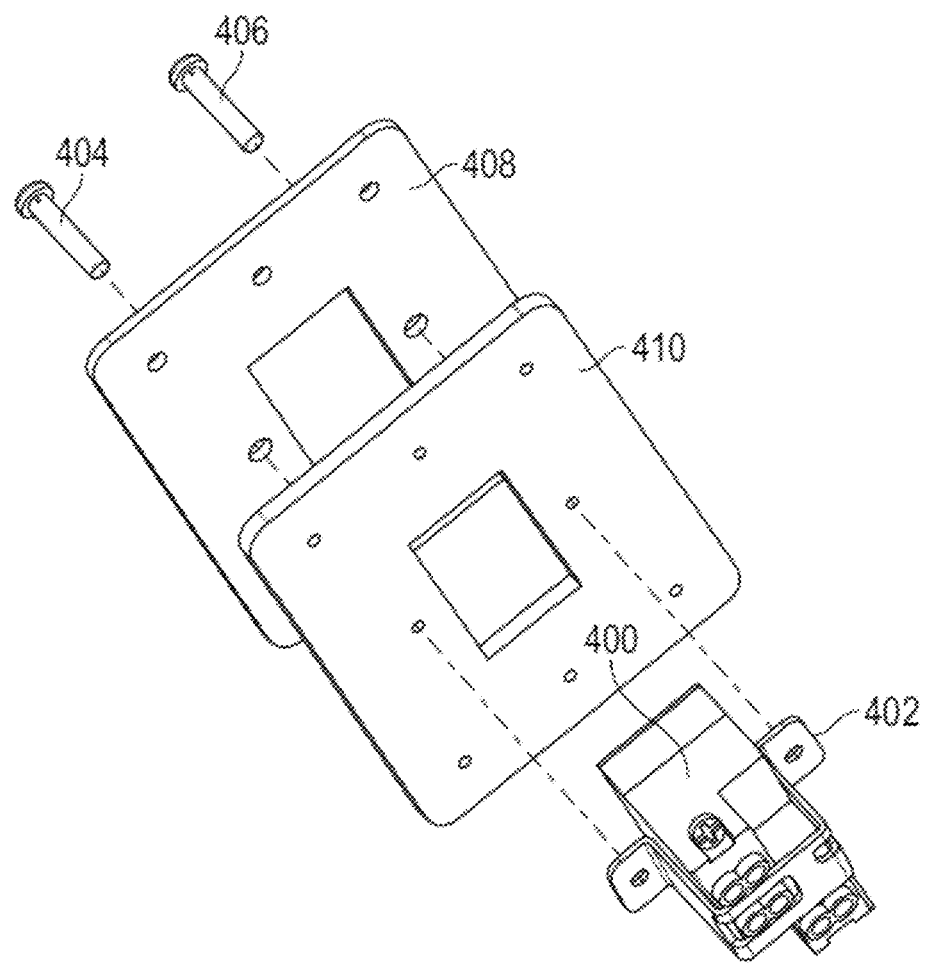
FIGS. 4A-4C illustrate exploded views of a kit used for attaching L-type electrical outlets and a main breaker to an L-type electrical outlet body.
Figure 4B:
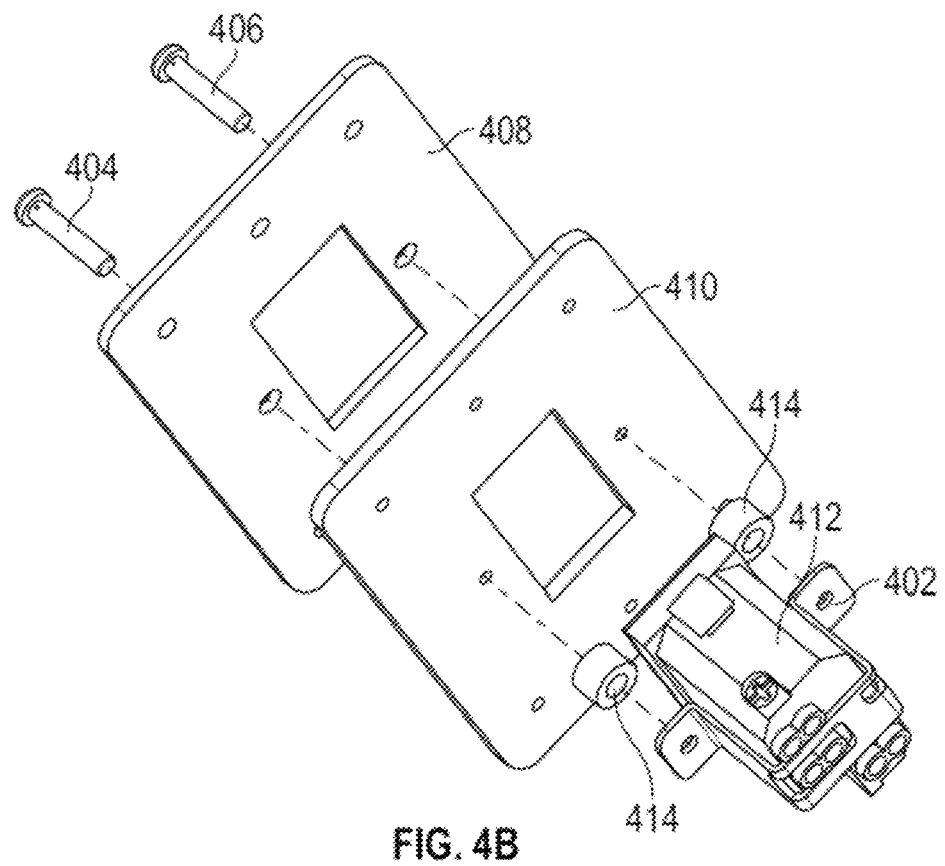
Figure 4C:
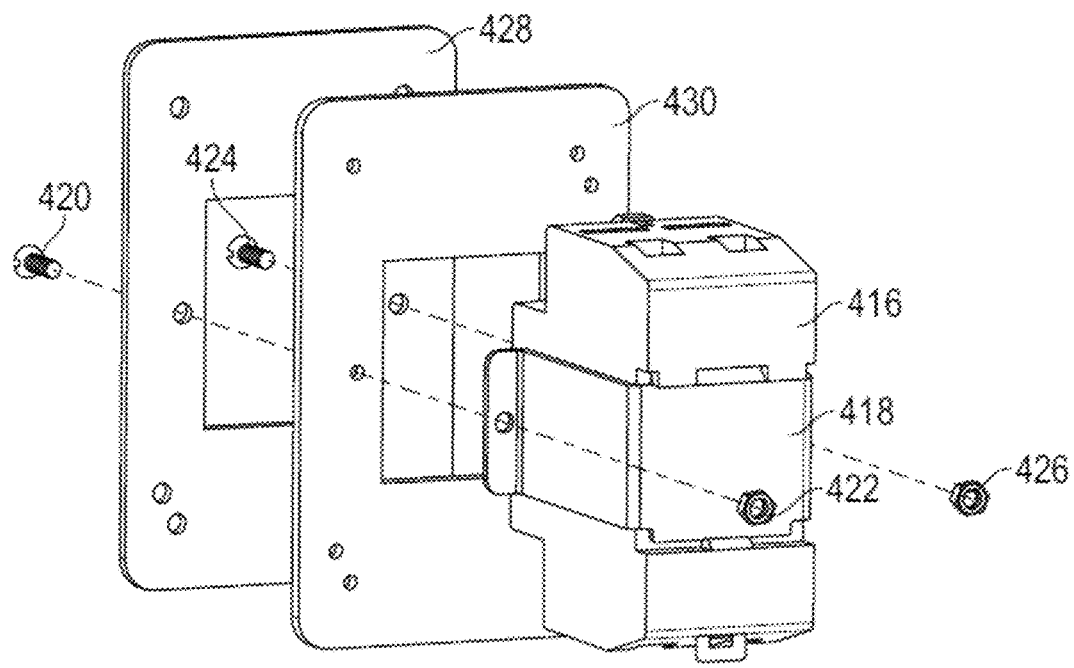

FIGS. 4A-4C illustrate exploded views of a kit used for attaching L-type electrical outlets or a main breaker to an L-type electrical outlet body. Referring to FIGS. 4A and 4B, a kit for attaching an L-type electrical outlet to an L-type electrical outlet body such as described with respect to FIGS. 2A-2D includes an L-type Omega bracket 402, a left Omega bracket screw 404, a right Omega bracket screw 406, an electrical outlet plate 408, an electrical outlet gasket 410, and a pair of Omega bracket bushings 414.

Referring to FIG. 4A, when attaching a Vimar L-type electrical outlet 400 as the L-type electrical outlet, the parts of the kit that are used include the L-type Omega bracket 402, the left Omega bracket screw 404, the right Omega bracket screw 406, the electrical outlet plate 408, and the electrical outlet gasket 410.

Referring to FIG. 4B, when attaching a Bticino L-type electrical outlet 412 (e.g., a Bticino A5180 or Bticino AM5180 L-type electrical outlet) as the L-type electrical outlet, the parts of the kit that are used include the L-type Omega bracket 402, the left Omega bracket screw 404, the right Omega bracket screw 406, the electrical outlet plate 408, the electrical outlet gasket 410, and the pair of Omega bracket bushings 414. Due to the different sizes of various L-type electrical outlets, the pair of Omega bracket bushings 414 are able to be used to provide a flush and/or more secure fit of the L-type electrical outlet 412. Advantageously, any commercially available L-type electrical outlet may be used by inclusion of the pair of Omega bracket bushings 414 (e.g., and if the pair of Omega bracket bushings 414 are not needed for the specific L-type electrical outlet being used, they may be left out of the kit or not used).

Referring to FIG. 4C, a kit for attaching a main breaker 416 to an L-type electrical outlet body includes a main breaker Omega bracket 418, a left Omega bracket bolt 420 and corresponding nut 422, a right Omega bracket bolt 424 and corresponding nut 426, a main breaker plate 428, and a main breaker gasket 430.

Referring to FIGS. 4A-4C, it should be understood that other components may be included in the kit, such as those discussed with respect to FIGS. 2A-2D.

Figure 5B:
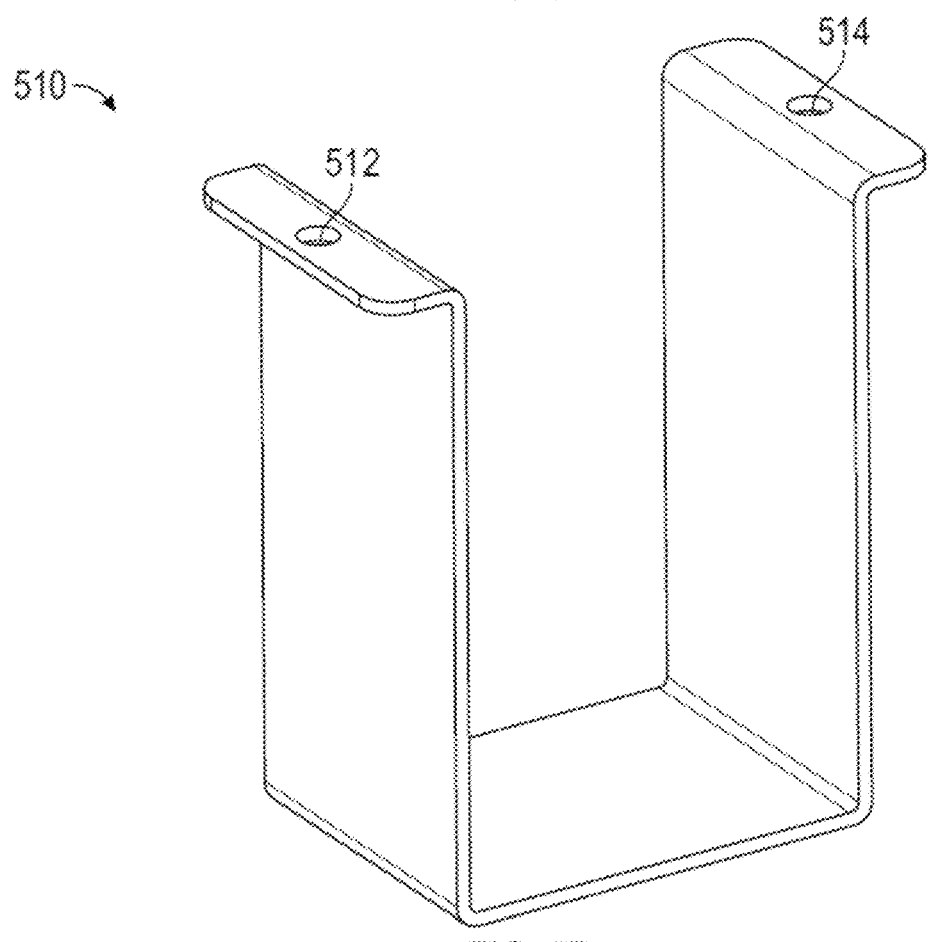

FIGS. 5A and 5B illustrate Omega brackets that may be included in a kit. Referring to FIG. 5A, an L-type Omega bracket 500 includes a first cut-out 502 and a second cut-out 504 to assemble with a backside of an L-type electrical outlet. The L-type Omega bracket further includes a left attachment aperture 506 and a right attachment aperture 508 for receiving Omega bracket screws. The L-type Omega bracket is also shaped to receive any commercially available L-type electrical outlet. The L-type Omega bracket 500 may be made of aluminum or some other material that can withstand industrial environments. The L-type Omega bracket 500 may also be coated with PVC or some other non-electrically conductive material to reduce the occurrence of an electric arc.

Referring to FIG. 5B, a main breaker Omega bracket 510 includes a left attachment aperture 512 and a right attachment aperture 514 for receiving Omega bracket screws and/or bolts. The main breaker Omega bracket 510 is also shaped to receive any commercially available main breaker. The main breaker Omega bracket 510 may be made aluminum or some other material that can withstand industrial environments.

Figure 6B:
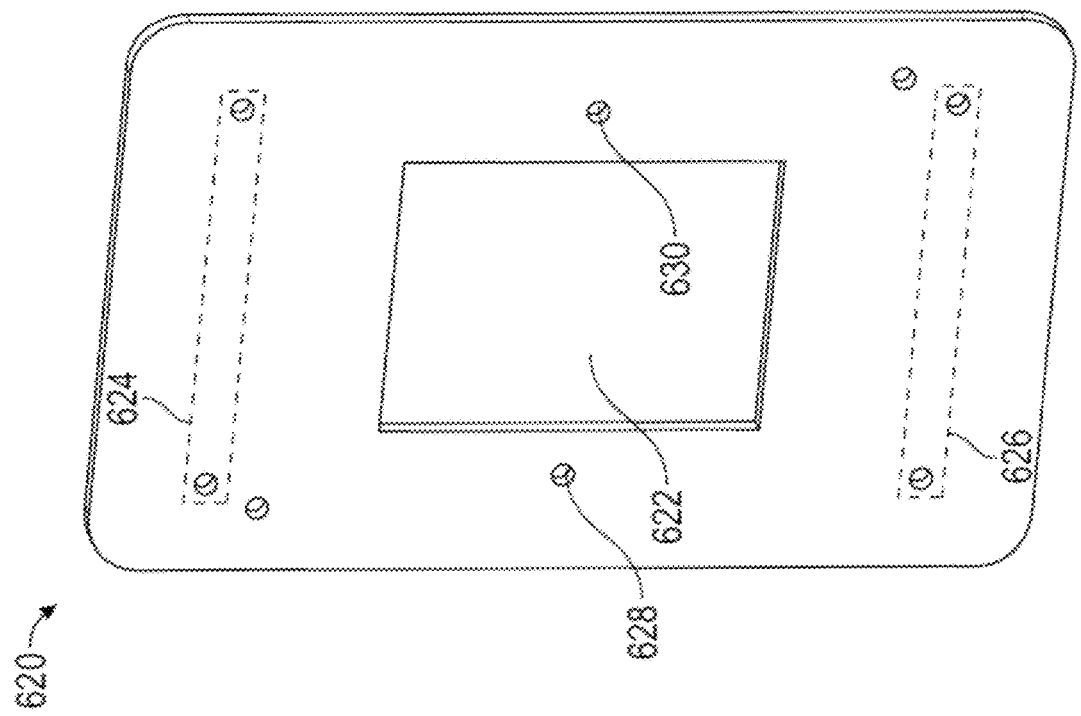
FIGS. 6A and 6B illustrate gaskets that may be included in a kit.
Figure 6A:
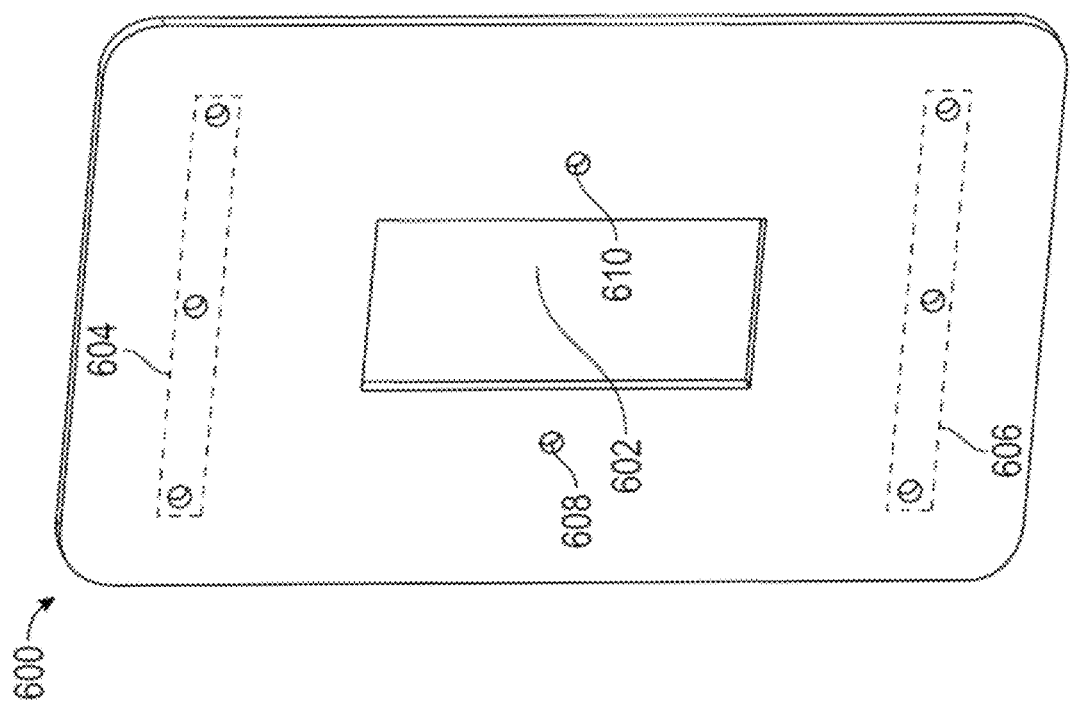

FIGS. 6A and 6B illustrate gaskets that may be included in a kit. Referring to FIG. 6A, an L-type gasket 600 includes an L-type electrical outlet aperture 602 that is sized to receive any commercially available L-type electrical outlet (e.g., includes a width and height that correspond to the maximum width and maximum height of any commercially available L-type electrical outlet). The L-type gasket 600 further includes a plurality of top screw apertures 604 that correspond to/match with the plurality of top screw apertures of the outlet side 206 of the body 202 of the L-type electrical outlet housing 200 of FIGS. 2A-2D, a plurality of bottom screw apertures 606 that correspond to/match with the plurality of bottom screw apertures of the outlet side 206 of the body 202 of the L-type electrical outlet housing 200 of FIGS. 2A-2D, and a left and right Omega bracket apertures 608, 610 that correspond to/match with the left and right Omega bracket apertures of the outlet side 206 of the body 202 of the L-type electrical outlet housing 200 of FIGS. 2A-2D.

Referring to FIG. 6B, a main breaker gasket 620 includes a main breaker aperture 622 that is sized to receive any commercially available main breaker (e.g., includes a width and height that correspond to the maximum width and maximum height of any commercially available main breaker that is used with L-type electrical outlets). The main breaker gasket 620 further includes a plurality of top screw apertures 624 that correspond to/match with at least a portion of the plurality of top screw apertures of the outlet side 206 of the body 202 of the L-type electrical outlet housing 200 of FIGS. 2A-2D (e.g., the top left corner and the top right corner), a plurality of bottom screw apertures 626 that correspond to/match with at least a portion of the plurality of bottom screw apertures of the outlet side 206 of the body 202 of the L-type electrical outlet housing 200 of FIGS. 2A-2D (e.g., the bottom left corner and the bottomer right corner), and a left and right Omega bracket apertures 628, 630 that correspond to/match with the left and right Omega bracket apertures of the outlet side 206 of the body 202 of the L-type electrical outlet housing 200 of FIGS. 2A-2D.

Figure 7B:
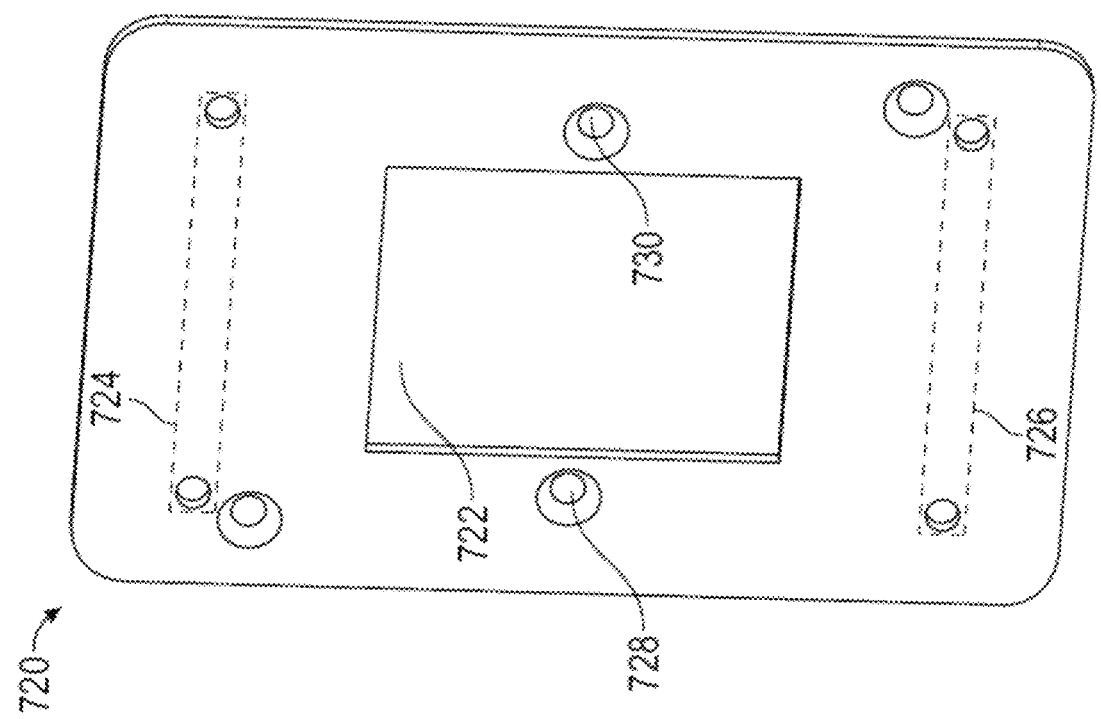
FIGS. 7A and 7B illustrate electrical outlet plates that may be included in a kit.
Figure 7A:
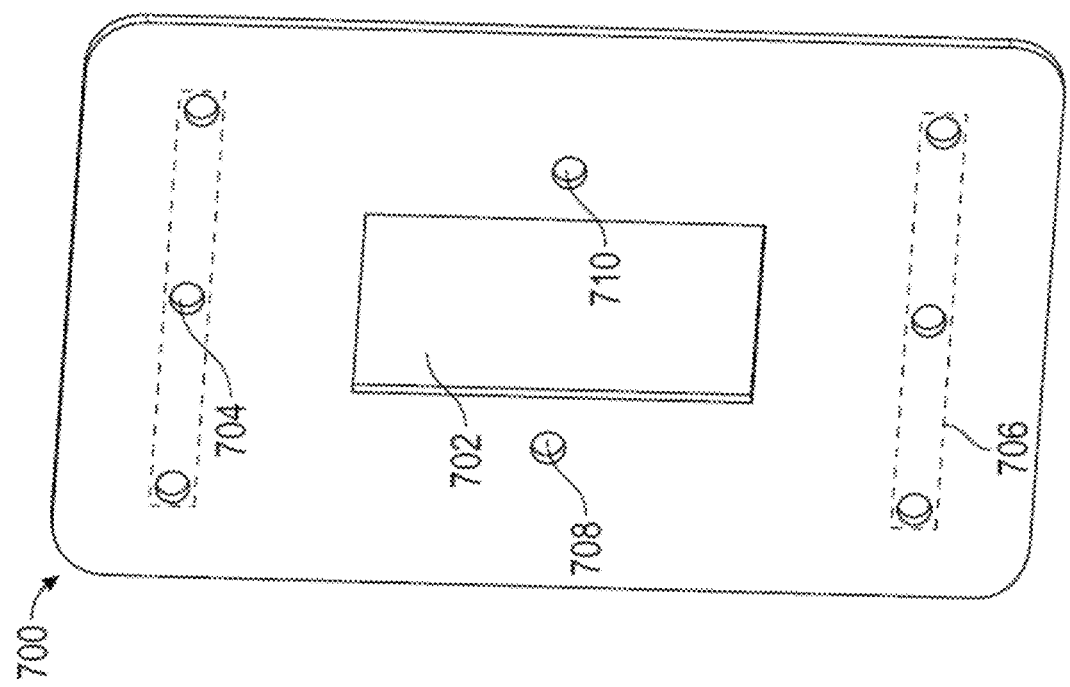

FIGS. 7A and 7B illustrate electrical outlet plates that may be included in a kit. Referring to FIG. 7A, an L-type electrical outlet plate 700 includes an L-type electrical outlet aperture 702 that is sized to receive any commercially available L-type electrical outlet (e.g., includes a width and height that correspond to the maximum width and maximum height of any commercially available L-type electrical outlet). The L-type electrical outlet plate 700 further includes a plurality of top screw apertures 704 that correspond to/match with the plurality of top screw apertures of the outlet side 206 of the body 202 of the L-type electrical outlet housing 200 of FIGS. 2A-2D, a plurality of bottom screw apertures 706 that correspond to/match with the plurality of bottom screw apertures of the outlet side 206 of the body 202 of the L-type electrical outlet housing 200 of FIGS. 2A-2D, and a left and right Omega bracket apertures 708, 710 that correspond to/match with the left and right Omega bracket apertures of the outlet side 206 of the body 202 of the L-type electrical outlet housing 200 of FIGS. 2A-2D.

Referring to FIG. 7B, a main breaker plate 720 includes a main breaker aperture 722 that is sized to receive any commercially available main breaker (e.g., includes a width and height that correspond to the maximum width and maximum height of any commercially available main breaker that is used with L-type electrical outlets). The main breaker plate 720 further includes a plurality of top screw apertures 724 that correspond to/match with at least a portion of the plurality of top screw apertures of the outlet side 206 of the body 202 of the L-type electrical outlet housing 200 of FIGS. 2A-2D (e.g., the top left corner and the top right corner), a plurality of bottom screw apertures 726 that correspond to/match with at least a portion of the plurality of bottom screw apertures of the outlet side 206 of the body 202 of the L-type electrical outlet housing 200 of FIGS. 2A-2D (e.g., the bottom left corner and the bottomer right corner), and a left and right Omega bracket apertures 728, 730 that correspond to/match with the left and right Omega bracket apertures of the outlet side 206 of the body 202 of the L-type electrical outlet housing 200 of FIGS. 2A-2D. The L-type electrical outlet plate 700 and the main breaker plate 720 are each made of aluminum or some other material that can withstand industrial environments.

As illustrated and described herein, an L-type electrical outlet housing can be easily mounted to a Unistrut channel using a plate that is sized for the Unistrut channel. Further, by removing the mounting feet on the housing, yield can be improved. In addition, through use of an Omega bracket and an optional pair of Omega bracket bushings, along with a universal sized aperture in an electrical outlet plate, it is possible to mount different types of L-type electrical outlets to the housing.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. An L-type electrical outlet housing, comprising:
a body sized to house at least one L-type electrical outlet, the body comprising an outlet side and a mounting side on an opposite side of the body as the outlet side,
wherein the outlet side of the body comprises an insertion aperture for receiving an Omega bracket and an L-type electrical outlet within the body, a plurality of top screw apertures above the insertion aperture for securing a gasket and an electrical outlet plate with a first plurality of screws, a plurality of bottom screw apertures below the insertion aperture for securing the gasket and the electrical outlet plate with a second plurality of screws, a left Omega bracket aperture positioned to the left of the insertion aperture for securing the Omega bracket with a left Omega bracket screw, and a right Omega bracket aperture positioned to the right of the insertion aperture for securing the Omega bracket with a right Omega bracket screw,
wherein the mounting side of the body comprises a left housing screw aperture and a right housing screw aperture for mounting the body.

2. The L-type electrical outlet housing of claim 1, wherein the left housing screw aperture and the right housing screw aperture of the mounting side of the body are positioned at a vertical midpoint of the mounting side of the body.

3. The L-type electrical outlet housing of claim 1, wherein the mounting side of the body does not include a protruding mounting foot.

4. The L-type electrical outlet housing of claim 1, wherein the body is monolithic.

5. The L-type electrical outlet housing of claim 1, wherein the outlet side of the body further comprises a second insertion aperture, a second plurality of top screw apertures above the second insertion aperture for securing a second gasket and a second electrical outlet plate with a third plurality of screws, a second plurality of bottom screw apertures below the second insertion aperture for securing the second gasket and the second electrical outlet plate with a fourth plurality of screws, a second left Omega bracket aperture positioned to the left of the second insertion aperture for securing a second Omega bracket with a second left Omega bracket screw, and a second right Omega bracket aperture positioned to the right of the second insertion aperture for securing the second Omega bracket with a second right Omega bracket screw.

6. The L-type electrical outlet housing of claim 1, wherein the second insertion aperture of the outlet side of the body is configured to receive a second L-type electrical outlet or a main breaker.

7. The L-type electrical outlet housing of claim 1, wherein the outlet side of the body further comprises a third insertion aperture for receiving a third L-type electrical outlet within the body, a third plurality of top screw apertures above the third insertion aperture for securing a third gasket and a third electrical outlet plate with a fifth plurality of screws, a third plurality of bottom screw apertures below the third insertion aperture for securing the third gasket and the third electrical outlet plate with a sixth plurality of screws, a third left Omega bracket aperture positioned to the left of the third insertion aperture for securing a third Omega bracket with a third left Omega bracket screw, and a third right Omega bracket aperture positioned to the right of the third insertion aperture for securing the third Omega bracket with a third right Omega bracket screw.

8. The L-type electrical outlet housing of claim 1, wherein the outlet side of the body further comprises a fourth insertion aperture for receiving a fourth L-type electrical outlet within the body, a fourth plurality of top screw apertures above the fourth insertion aperture for securing a fourth gasket and a fourth electrical outlet plate with a seventh plurality of screws, a fourth plurality of bottom screw apertures below the fourth insertion aperture for securing the fourth gasket and the fourth electrical outlet plate with an eighth plurality of screws, a fourth left Omega bracket aperture positioned to the left of the fourth insertion aperture for securing a fourth Omega bracket with a fourth left Omega bracket screw, and a fourth right Omega bracket aperture positioned to the right of the fourth insertion aperture for securing the fourth Omega bracket with a fourth right Omega bracket screw.

9. The L-type electrical outlet housing of claim 1, wherein the body further comprises a top side and a bottom side, wherein at least one of the top side or the bottom side of the body comprises an electrical inlet aperture configured to receive electrical conduit.

10. A kit for securing an L-type electrical outlet housing comprising a body sized to house at least one L-type electrical outlet, the body comprising an outlet side and a mounting side on an opposite side of the body as the outlet side, wherein the outlet side of the body comprises an insertion aperture for receiving an Omega bracket and an L-type electrical outlet within the body, a plurality of top screw apertures above the insertion aperture for securing a gasket and an electrical outlet plate with a first plurality of screws, a plurality of bottom screw apertures below the insertion aperture for securing the gasket and the electrical outlet plate with a second plurality of screws, a left Omega bracket aperture positioned to the left of the insertion aperture for securing the Omega bracket with a left Omega bracket screw, and a right Omega bracket aperture positioned to the right of the insertion aperture for securing the Omega bracket with a right Omega bracket screw, wherein the mounting side of the body comprises a left housing screw aperture and a right housing screw aperture for mounting the body, the kit comprising:

a first spring cover for covering the insertion aperture after the Omega bracket and the L-type electrical outlet are received;

a mounting strap for attachment to a Unistrut Channel or a wall, the mounting strap comprising a left housing aperture, a left mounting aperture that extends past the body when mounted to the Unistrut Channel or a wall, a right housing aperture, and a right mounting aperture that extends past the body when mounted to the Unistrut Channel or a wall;

the gasket;

the electrical outlet plate;

the Omega bracket;

the left Omega bracket screw;

the right Omega bracket screw;

the first plurality of screws;

the second plurality of screws;

the left housing screw;

the right housing screw;

a left mounting screw; and a right mounting screw.

11. The kit of claim 10, wherein the outlet side of the body of the L-type electrical outlet housing further comprises a second insertion aperture, a second plurality of top screw apertures above the second insertion aperture for securing a second gasket and a second electrical outlet plate with a third plurality of screws, a second plurality of bottom screw apertures below the second insertion aperture for securing the second gasket and the second electrical outlet plate with a fourth plurality of screws, a second left Omega bracket aperture positioned to the left of the second insertion aperture for securing a second Omega bracket with a second left Omega bracket screw, and a second right Omega bracket aperture positioned to the right of the second insertion aperture for securing the second Omega bracket with a second right Omega bracket screw, the kit further comprising:

a second spring cover for covering the second insertion aperture after the second Omega bracket and a second L-type electrical outlet or a main breaker are received;

the second gasket;

the second electrical outlet plate;

the second Omega bracket;

the second left Omega bracket screw;

the second right Omega bracket screw;

the third plurality of screws; and the fourth plurality of screws.

12. The kit of claim 11, wherein the second Omega bracket is a main breaker Omega bracket or an L-type Omega bracket.

13. The kit of claim 11, wherein the outlet side of the body of the L-type electrical outlet housing further comprises a third insertion aperture for receiving a third L-type electrical outlet within the body, a third plurality of top screw apertures above the third insertion aperture for securing a third gasket and a third electrical outlet plate with a fifth plurality of screws, a third plurality of bottom screw apertures below the third insertion aperture for securing the third gasket and the third electrical outlet plate with a sixth plurality of screws, a third left Omega bracket aperture positioned to the left of the third insertion aperture for securing a third Omega bracket with a third left Omega bracket screw, and a third right Omega bracket aperture positioned to the right of the third insertion aperture for securing the third Omega bracket with a third right Omega bracket screw, the kit further comprising:
- a third spring cover for covering the third insertion aperture after the third Omega bracket and the third L-type electrical outlet are received;
- the third gasket;
- the third electrical outlet plate;
- the third Omega bracket;
- the third left Omega bracket screw;
- the third right Omega bracket screw;
- the fifth plurality of screws; and
- the sixth plurality of screws.

14. The kit of claim 13, wherein the outlet side of the body of the L-type electrical outlet housing further comprises a fourth insertion aperture for receiving a fourth L-type electrical outlet within the body, a fourth plurality of top screw apertures above the fourth insertion aperture for securing a fourth gasket and a fourth electrical outlet plate with a seventh plurality of screws, a fourth plurality of bottom screw apertures below the fourth insertion aperture for securing the fourth gasket and the fourth electrical outlet plate with an eighth plurality of screws, a fourth left Omega bracket aperture positioned to the left of the fourth insertion aperture for securing a fourth Omega bracket with a fourth left Omega bracket screw, and a fourth right Omega bracket aperture positioned to the right of the fourth insertion aperture for securing the fourth Omega bracket with a fourth right Omega bracket screw, the kit further comprising:
- a fourth spring cover for covering the fourth insertion aperture after the fourth Omega bracket and the fourth L-type electrical outlet are received;
- the fourth gasket;
- the fourth electrical outlet plate;
- the fourth Omega bracket;
- the fourth left Omega bracket screw;
- the fourth right Omega bracket screw;
- the seventh plurality of screws; and
- the eighth plurality of screws.

15. The kit of claim 10, wherein the electrical outlet plate and the gasket are sized to receive any commercially available L-type electrical outlet.

16. The kit of claim 10, further comprising a pair of Omega bracket bushings.

* * * * *